United States Patent
Esswein

(10) Patent No.: US 11,806,911 B2
(45) Date of Patent: *Nov. 7, 2023

(54) LAMELLA BLOCK WITH OFFSET LAMELLAE

(71) Applicant: KRAUSSMAFFEI TECHNOLOGIES GMBH, Munich (DE)

(72) Inventor: Michael Esswein, Fahrenzhausen (DE)

(73) Assignee: KRAUSSMAFFEI TECHNOLOGIES GMBH, Munich (DE)

(*) Notice: Subject to any disclaimer, the term of this patent is extended or adjusted under 35 U.S.C. 154(b) by 0 days.

This patent is subject to a terminal disclaimer.

(21) Appl. No.: 17/428,465

(22) PCT Filed: Feb. 13, 2020

(86) PCT No.: PCT/EP2020/053699
§ 371 (c)(1),
(2) Date: Aug. 4, 2021

(87) PCT Pub. No.: WO2020/187497
PCT Pub. Date: Sep. 24, 2020

(65) Prior Publication Data
US 2022/0097277 A1    Mar. 31, 2022

(30) Foreign Application Priority Data

Mar. 21, 2019    (DE) .......................... 102019002011.1

(51) Int. Cl.
*B29C 48/09* (2019.01)
*B29C 48/90* (2019.01)
(Continued)

(52) U.S. Cl.
CPC .............. *B29C 48/09* (2019.02); *B22F 10/28* (2021.01); *B22F 10/80* (2021.01); *B29C 48/903* (2019.02);
(Continued)

(58) Field of Classification Search
CPC .... B29C 48/28; B22F 10/80; B22F 2003/166; B22F 2005/005; B22F 2999/00;
(Continued)

(56) References Cited

U.S. PATENT DOCUMENTS 7,293,975 B2 * 11/2007 Stieglitz ................ B29C 48/903
425/71
2003/0211657 A1    11/2003 Williams et al.
(Continued)

FOREIGN PATENT DOCUMENTS

DE    198 43 340 C2    11/2001
DE    10315125 B3    9/2004
(Continued)

OTHER PUBLICATIONS

International Search Report for PCT/EP2020/053699 dated May 27, 2020.
(Continued)

*Primary Examiner* — Lynda Salvatore
(74) *Attorney, Agent, or Firm* — Pearne & Gordon LLP

(57) ABSTRACT

A lamella block is provided for a calibrating device for calibrating an extruded profile. The lamella block includes a lamella structure, which has a plurality of lamellae that are spaced apart from each other by grooves and arranged in the longitudinal direction of the lamella block. The lamella structure has two lamella sets, wherein the lamellae of the first lamella set are arranged offset in relation to the lamellae of the second lamella set in the longitudinal direction of the lamella block. Further provided is a method for manufacturing the lamella block mentioned above as well as a calibrating device, which includes a plurality of the lamella blocks mentioned above. Also provided is a system for (Continued)

additively manufacturing the lamella block mentioned above, a corresponding computer program and a corresponding dataset.

16 Claims, 6 Drawing Sheets

(51) Int. Cl.
  *B22F 10/28* (2021.01)
  *B22F 10/80* (2021.01)
  *B29C 48/12* (2019.01)
  *B22F 5/00* (2006.01)

(52) U.S. Cl.
  CPC .......... *B29C 48/907* (2019.02); *B29C 48/908* (2019.02); *B22F 2005/005* (2013.01); *B29C 48/12* (2019.02)

(58) Field of Classification Search
  CPC ... B22F 3/20; B22F 5/10; B29C 48/09; B29C 48/12; B29C 48/903; B29C 48/904; B29C 48/907; B29C 48/908; B33Y 10/00; B33Y 50/00; B33Y 80/00
  USPC .......... 425/326.1, 71, 392, 77, 325, 326, 388
  See application file for complete search history.

(56) References Cited

U.S. PATENT DOCUMENTS

| | | |
|---|---|---|
| 2006/0034965 A1 | 2/2006 | Ulrich et al. |
| 2006/0071372 A1 | 4/2006 | Stieglitz et al. |
| 2006/0159796 A1 | 7/2006 | Schmuhl et al. |
| 2006/0240134 A1 | 10/2006 | Stieglitz |

FOREIGN PATENT DOCUMENTS

| | | |
|---|---|---|
| DE | 102005002820 B3 | 5/2006 |
| DE | 102009016100 A1 | 10/2010 |
| WO | 2004103684 A1 | 12/2004 |

OTHER PUBLICATIONS

Written Opinion for PCT/EP2020/053699 dated May 27, 2020.
Powder Metallurgy Review, "Additive Manufacturing with metal powders: Design for Manufacture evolves into Design for Function", 2014, pp. 41-51.

* cited by examiner

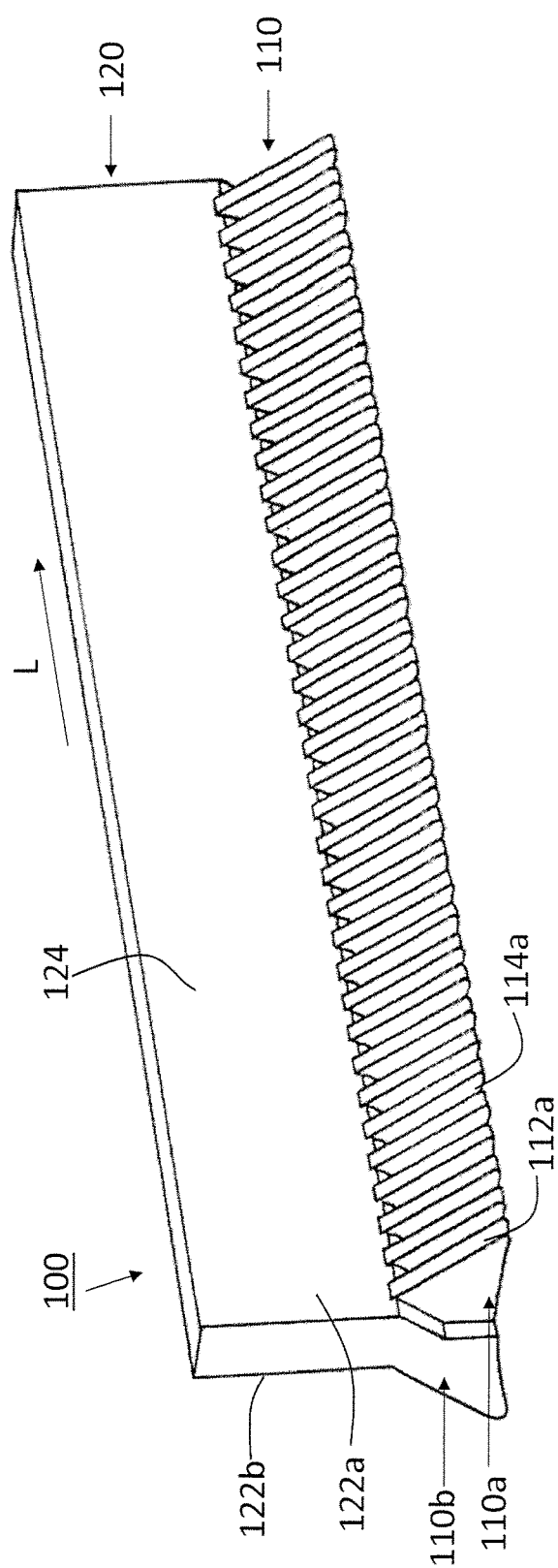
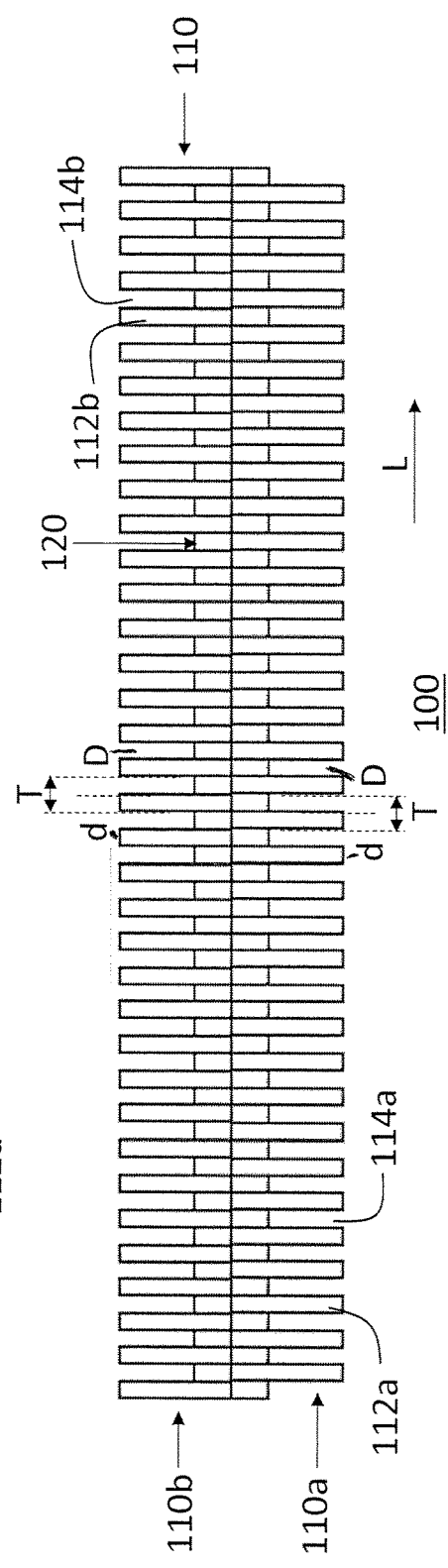
Fig. 3a
Fig. 3b

LAMELLA BLOCK WITH OFFSET LAMELLAE

CROSS-REFERENCE TO RELATED APPLICATIONS

This is a National Stage application of PCT international application PCT/EP2020/053699 filed on Feb. 13, 2020, which claims the priority of German Patent Application No. 10 2019 002 011.1, filed Mar. 21, 2019, which are incorporated herein by reference in their entireties.

FIELD OF THE INVENTION

The invention relates to a lamella block for a calibrating device for calibrating an extruded profile. The invention further relates to a method for manufacturing such a lamella block, a system for additively fabricating such a lamella block, and a corresponding computer program and dataset.

BACKGROUND OF THE INVENTION

Calibrating devices are used for calibrating extruded endless profiles, for example such as pipe profiles. During the manufacture of such profiles, a polymer melt desired for manufacturing the profile is first generated in an extruder. The generated polymer melt is then pressed through an outlet nozzle of the extruder, which prescribes the shape of the profile. The profile exiting the outlet nozzle of the extruder then runs through a calibrating device, which copies the still heated profile in a dimensionally accurate manner.

Such a calibrating device for dimensioning extruded profiles is known from DE 198 43 340 C2. Taught therein is a variably adjustable calibrating device, which is designed to calibrate extruded plastic pipes with a varying pipe diameter. The calibrating device comprises a housing and a plurality of lamella blocks circularly arranged in the housing, which together form a calibrating basket with a circular calibrating opening, through which the pipes to be calibrated are guided (see in particular FIGS. 1 and 2 of DE 198 43 340 C2). In addition, each lamella block is coupled with an activating device, which is provided for individually radially displacing the respective lamella block. In this way, the active cross section of the circular calibrating opening formed by the plurality of lamella blocks can be correspondingly adjusted as needed.

The lamella blocks described in DE 198 43 340 C2 each consist of a plurality of lamellae, which are threaded onto two spaced apart carrier rods. Spacer sleeves are used to maintain a desired distance between neighboring lamellae (see also FIG. 3 of DE 198 43 340 C2). An example for a threaded lamella block is further shown on FIG. 1. The lamella block 10 shown on FIG. 1 comprises a plurality of lamellae 12 and spacer sleeves 14, which are alternatingly threaded along two carrier rods 16. The spacer sleeves 14 establish the distances (grooves 13) between neighboring lamellae 12. Such threaded lamella blocks are complicated to manufacture, and thus cost-intensive.

Also known apart from the threaded lamella blocks described above are lamella blocks with closed carrier structures (or back structures). FIGS. 2a and 2b show an example of such a lamella block 20, wherein FIG. 2a shows a 3D view of the lamella block 20, and FIG. 2b shows a view on the interior side of the lamella block 20 facing the profile to be calibrated. The lamella block 20 comprises a plurality of lamellae 22, which are carried by a back structure 24 (see 3D view on FIG. 2a). The block-shaped carrier structure 24 is here realized in the form of a massive body (e.g., a rod-shaped body). Additional examples of lamella blocks with a closed back structure are known from WO 2004/103684 A1. Such lamella blocks can be integrally designed. They can be cost-effectively manufactured out of a material block via suitable machining operations (such as milling, cutting to size). However, it is also conceivable to use a casting process to manufacture the lamella block 20.

The lamella blocks 10, 20 shown on FIGS. 1, 2a and 2b share in common that the lamellae are symmetrical in design, and symmetrically arranged relative to the carrier rods 16 or carrier structure 24. The lamellae 12, 22 protrude equidistantly at opposing lateral sides of the lamella block 10, 20, and have the same division T in the longitudinal direction. Division T here refers to the smallest length within the lamella structure, after which the arrangement of lamellae 12, 22 repeats. The division T depends on the width d of the lamellae 12, 22 and the width D of the grooves 13, 23 within the lamella structure, and corresponds to the sum of the widths of a lamella 12, 22 and its neighboring groove 13, 23 (i.e., T=d+D).

When assembling the lamella blocks 10, 20 described above into a calibrating basket with an adjustable calibrating opening, adjacently arranged lamella blocks 10, 20 must be arranged offset relative to each other. This is because only in this way can the lamellae 12, 22 of a lamella block 10, 20 engage into the grooves 13, 23 of the adjacently arranged lamella block 10, 20, and depending on the strength of engagement generate a calibrating basket with a variable calibrating opening, as proposed in DE 194 43 340 C2.

The mutually offset arrangement of lamella blocks 10, 20 necessitates adjustments to the carrier structure of the respective lamella blocks 10, 20, so that the lamella blocks 10, 20 can be coupled with activating devices preinstalled in the calibrating device. The activating devices are provided for individually displacing the lamella blocks 10, 20 perpendicular to the feed direction of the profile to be calibrated. These adjustments relate in particular to the arrangement of coupling elements, such as receiving holes in the lamella carrier (not shown on FIGS. 2a and 2b), which are provided to realize a stable mechanical coupling between the activating devices and the respective lamella blocks 10, 20. As a consequence, it requires at least two sets of lamella blocks 10, 20, which are designed differently from each other at least in terms of the carrier structure or configuration of the coupling elements in the carrier structure, specifically in such a way that the carrier structure or its coupling elements compensate for the offset in the longitudinal direction of the lamella blocks that arises during assembly into a calibrating basket.

Alternatively, the offset that arises between neighboring lamella blocks during assembly into a calibrating basket can also be compensated or eliminated by providing two different sets of lamella blocks, which while they do have the same carrier structure, differ from each other with respect to the lamella structure. Specifically, a set of first lamella blocks is provided, which have a lamella structure arranged offset in relation to their respective carrier structure. Further provided is a set of second lamella blocks, whose lamella structure has no offset relative to their respective carrier structure. The offset in the longitudinal direction of the lamella blocks that arises during assembly into a calibrating basket is thus compensated by the offset arrangement of lamella structures on the carrier structure. This variant also requires two different sets of lamella blocks, so as to compensate for the offset that arises during lamella block assembly. However, providing two different lamella block sets for generating a lamella basket is complicated. In addition, care must be taken during lamella block assembly that the coordinated lamella blocks be alternatingly built into the calibrating device, which additionally complicates assembly.

BRIEF SUMMARY OF THE INVENTION

The object of the present invention is to provide lamella blocks for a calibrating device that further reduce or eliminate the problems highlighted in conjunction with prior art. In particular, the object of the present invention is to provide lamella blocks that eliminate the offset problems described above during the assembly of lamella blocks into a calibrating basket.

In a first aspect, the aforementioned object is achieved by providing a lamella block for a calibrating device for calibrating an extruded profile. The lamella block comprises a lamella structure having a plurality of lamellae, which are spaced apart from each other by grooves, and arranged in the longitudinal direction of the lamella blocks, wherein the lamella structure has two lamella sets, wherein the lamellae of the first lamella set are arranged offset relative to the lamellae of the second lamella set in the longitudinal direction of the lamella block.

The extruded profile can be a plastic profile. The extruded plastic profile can be an endless profile, for example a pipe profile.

The longitudinal direction of the lamella block can refer to the direction corresponding to a feed direction of a profile to be extruded.

The lamellae of the first lamella set can be arranged on a first side of the lamella block. The lamella of the second lamella set can further be arranged on a second side of the lamella block lying opposite the first side. As a consequence, the lamellae of the first lamella set can protrude on a first side of the lamella block, while the lamellae of the second lamella set protrude on a second side of the lamella block lying opposite the first side. The first side and second side can refer to the lateral sides (flanks) of the lamella blocks running in the longitudinal direction of the lamella block.

The lamellae of the first set and lamellae of the second set can be (essentially) identical in design. They can have the same shape and/or dimensions. Alternatively thereto, the lamellae of the first set and lamellae of the second set can be designed differently from each other. The lamellae of the first set can differ from the lamellae of the second set in terms of shape and/or dimensions.

Regardless of the specific configuration of lamellae in the first set and lamellae in the second set, the two lamella sets can have an identical or differing division (in the longitudinal direction of the lamella block). Division refers to the distance with each lamella set after which the arrangement of lamellae repeats. The division of each lamella set in the longitudinal direction of the lamella block (i.e., along the lamella block) depends on the width of the lamellae and the width of the grooves. The division (division length) of the lamella structure consists of the width of a lamella and the width of its adjacent groove.

In one variant, the lamellae of the first set could be offset in relation to the lamellae of the second lamella set in such a way that the lamellae of the first lamella set coincide with the grooves of the second lamella set in the longitudinal direction of the lamella block. The lamellae of the second lamella set could likewise coincide with the grooves of the first lamella set in the longitudinal direction of the lamella block. In other words, the lamellae of the first lamella set within the lamella structure can be arranged in the longitudinal direction of the lamella block where the grooves of the second lamella set are located and vice versa. This type of lamella structure is possible if the two lamella sets have the same division, for example.

The lamella block can further have a carrier structure on which the lamella structure is arranged. The carrier structure can comprise a block-shaped back structure with a beam-shaped design. The block-shaped back structure can further be provided with openings, so as to reduce the weight of the lamella block.

The carrier structure can be integrally designed with the lamellae or the lamella structure. In order to achieve an integral design, the lamella block can be manufactured by means of 3D printing. However, it is also conceivable that the lamella block be fabricated out of a single workpiece, for example via milling, drilling and/or cutting. Alternatively, the lamella structure or lamellae as well as the carrier structure can each be separately fabricated. The lamella structure (or lamellae) can then be correspondingly connected with the carrier structure.

The carrier structure and the lamellae can be fabricated out of the same material or out of different materials. In one variant, the material used to fabricate the carrier structure and/or lamellae can consist of a metal material. However, the use of a polymer material (with additives) is also conceivable.

Another aspect of the invention provides a calibrating device for calibrating extruded plastic profiles, wherein the calibrating device has a plurality of the lamella blocks according to the invention, which are arranged relative to each other to form a calibrating opening. The lamella blocks can here be arranged so as to form a circular calibrating opening.

The calibrating device can further comprise a plurality of activating devices, wherein each activating device is coupled with a respective lamella block. The activating device makes it possible to individually activate each lamella block radially to the calibrating opening. As a result, the active cross section of the calibrating opening can be adjusted as needed to the cross section (diameter) of the profile to be calibrated.

In addition, the calibrating device can have a housing, which is provided for receiving and storing the activating device and the lamella blocks coupled with the activating devices.

Another aspect of the invention provides a method for manufacturing a lamella block as described above. The method for manufacturing a lamella block involves at least the step of manufacturing the lamella block by means of 3D printing or by means of additive manufacturing processes. The manufacture of the lamella block in a 3D printing process or additive manufacturing processes can here comprise the layer by layer laser sintering or laser melting of material layers, wherein the material layers are applied one after the other (sequentially) according to the shape of the lamella block to be generated.

The method can further involve the step of calculating a lamella block geometry (CAD data), and optionally the step of converting the 3D geometric data into corresponding control commands for 3D printing or additive manufacturing.

Another aspect provides a method for manufacturing a lamella block that involves the following steps: Generating a dataset, which images the lamella block as described above, and storing the dataset on a storage device or a server.

The method can further involve: Inputting the dataset into a processing device or a computer, which actuates an additive manufacturing device so that the latter fabricates the lamella block imaged in the dataset.

Another aspect provides a system for additively manufacturing a lamella block, with a dataset generating device for generating a dataset that images the lamella block described as above, a storage device for storing the dataset and a processing device for receiving the dataset and for actuating an additive manufacturing device in such a way that the latter fabricates the lamella block imaged in the dataset. The storage device can be a USB stick, a CD ROM, a DVD, a memory card or a hard disk. The processing device can be a computer, a server or a processor.

Another aspect provides a computer program or computer program product, comprising datasets, which while the datasets are being read in by a processing device or a computer, prompts the latter to actuate an additive manufacturing device in such a way that the additive manufacturing device fabricates the lamella block as described above.

Another aspect provides a computer-readable data carrier, which stores the computer program described above. The computer-readable data carrier can be a USB stick, a CD-ROM, a DVD, a memory card or a hard disk.

Another aspect provides a dataset, which images the lamella block as described above. The dataset can be stored on a computer-readable data carrier.

BRIEF DESCRIPTION OF THE DRAWINGS

Additional advantages, details and aspects of the present invention are discussed based on the drawings below. Shown on:

FIG. 3a/3b are views of a lamella block according to the present invention;

DESCRIPTION OF EXAMPLE EMBODIMENTS

Figure 1:
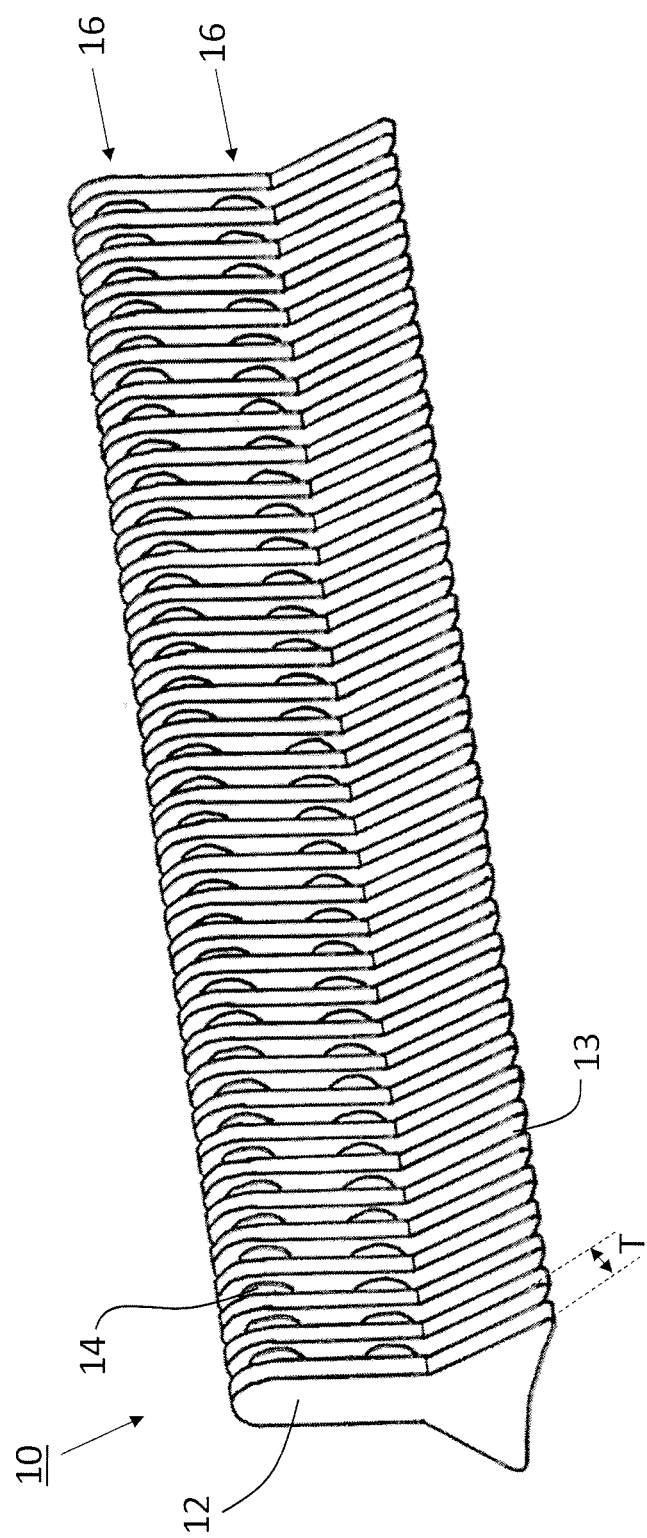
FIG. 1 is a 3D view of a lamella block for a calibrating device according to prior art.
Figure 2A:
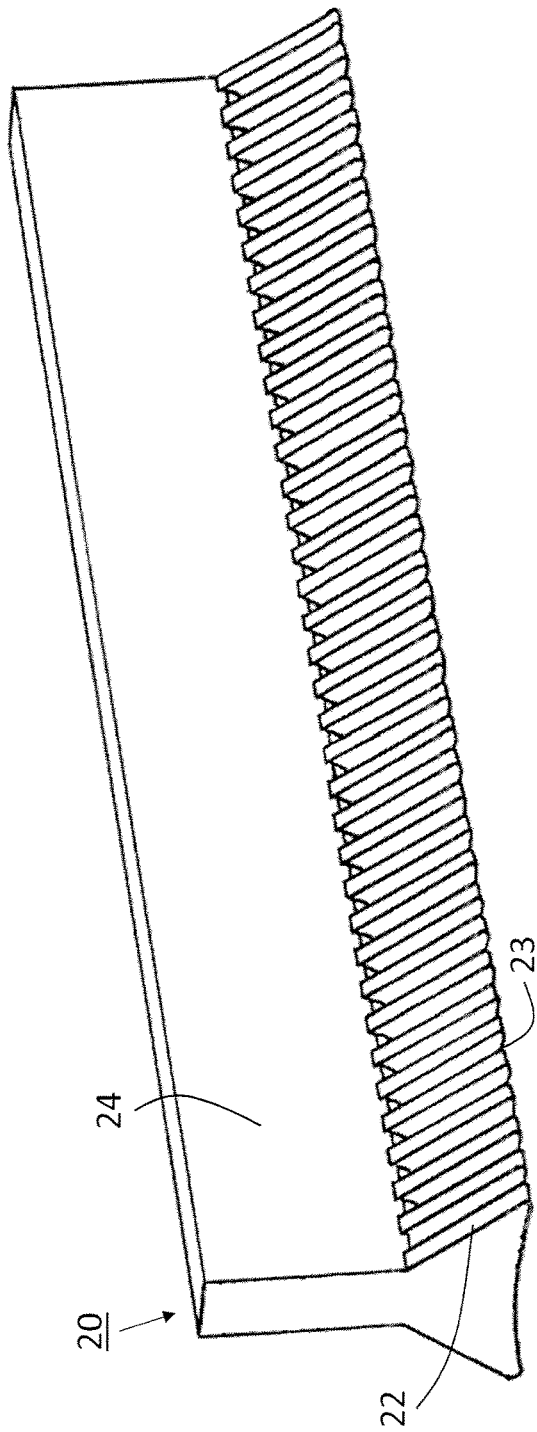
FIG. 2a/2b are views of another lamella block for a calibrating device according to prior art.
Figure 2B:
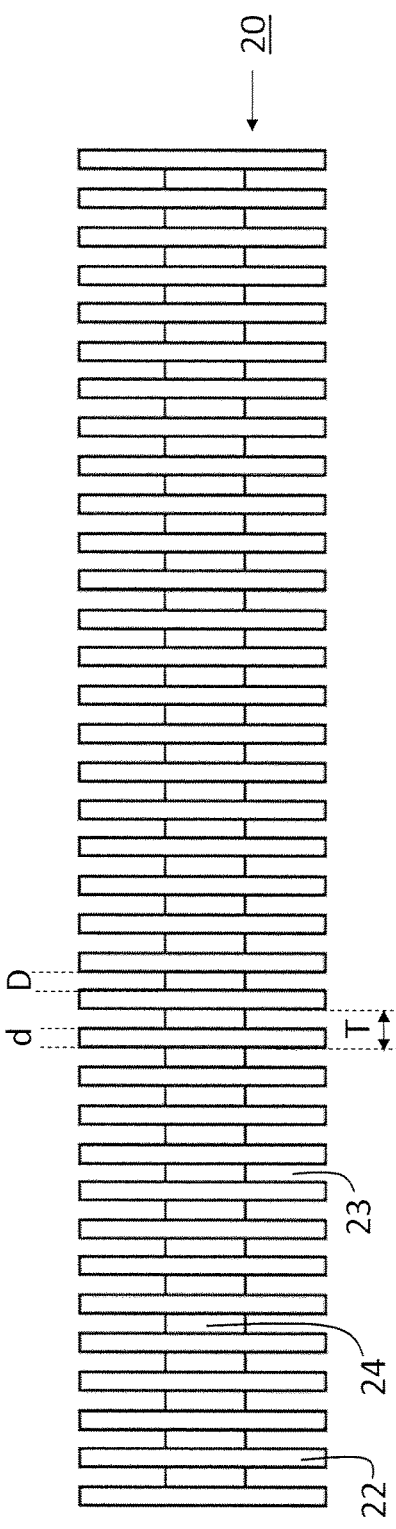

FIGS. 1, 2a and 2b were already discussed at the outset in conjunction with prior art. Let reference be made to the description there.

In conjunction with FIGS. 3a and 3b, a lamella block 100 according to the invention for a calibrating device will now be described in more detail. FIG. 3a shows a 3D view of a lamella block 100. FIG. 3b shows a view on an interior side of the lamella block 100. Interior side denotes the side of the lamella block 100 that faces a profile to be calibrated.

The lamella block 100 comprises a lamella structure 110, which comprises a plurality of lamellae 112*1*, 112*b* and grooves 114*a*, 114*b*, which separate neighboring lamellae 112*a*, 112*b* from each other. Grooves 114*a*, 114*b* denote the free spaces (distances) between sequential lamellae 112*a*, 112*b*. On FIG. 3*b*, each individual lamella 112*a*, 112*b* of the lamella structure 110 is shown in the form of a transverse beam. The lamella block 100 further comprises a carrier structure 120 for receiving (storing) the lamellae 112 (or lamella structure 110). The carrier structure 120 is integrally designed with the lamella structure 110. As an alternative to the embodiment shown on FIG. 3*a*, the carrier structure 120 and the lamella structure 110 (or the lamellae 112*a*, 112*b*) can each be designed as separate lamella block elements. The lamella structure 110 or its lamellae 112*a*, 112*b* are then correspondingly arranged and mounted along the carrier structure 110.

The carrier structure 120 along which the lamellae 112*a*, 112*b* are arranged is shown on FIG. 3*a*, and will be described in more detail below. The carrier structure 120 comprises a back structure 124 with a block-shaped design. The back structure 124 is designed as an oblong, beam-shaped body. The body with a beam-shaped design has a rectangular cross section perpendicular to the longitudinal direction L. The back structure 124 can further have coupling elements, for example threaded holes, which are provided for mechanically coupling the lamella block 100 with an activating device (not shown on FIG. 3*a*).

As an alternative to the back structure 124 with a beam-shaped design described here, the carrier structure 120 of the lamella block 100 can have at least one carrier rod, on which the lamellae 112 are threaded, as described at the outset in conjunction with the lamella block on FIG. 1. The distance (grooves) between sequential lamellae 112 is realized in the threaded lamella block by means of spacer sleeves of a suitable length.

The lamella structure 110 of the lamella block 100 will now be described in more detail below. The lamella structure 100 comprises two lamella sets 110*a*, 110*b*, wherein a first lamella set 110*a* comprises lamellae 112*a* and a second lamella set 110*b* comprises lamellae 112*b*. The lamellae 112*a* of the first lamella set 110*a* are arranged offset relative to the lamellae 112*b* of the second lamella set 110*b* in the longitudinal direction L of the lamella block 100. The lamellae 112*a*, 112*b* of the two lamella sets 110*a*, 110*b* are further designed and arranged in the longitudinal direction L of the lamella block 100 in such a way that the lamellae 112*a* of the first lamella set 110*a* protrude on a first lateral side 122*a* of the lamella block 100, while the lamellae 112*b* of the second lamella set 110*b* protrude on a second lateral side 122*b* of the lamella block 100. The second lateral side 122*b* is here arranged opposite the first lateral side.

The structure and arrangement of the two lamella sets 110*a*, 110*b* will be described in more detail in conjunction with FIG. 3*b*. The two lamella sets 110*a*, 110*b* each have the same division T in the longitudinal direction L of the lamella block 100. Division T (or division length) here refers to the distance after which the arrangement of lamellae 112*a*, 112*b* within the respective lamella sets 110*a*, 110*b* repeats along the lamella structure 110. The division consists of the width d of the respective lamellae 112*a*, 112*b* and the width D of the respective grooves 114*a*, 114*b* between the lamellae 112*a*, 112*b*, i.e., T=d+D (see FIG. 3*b*). As further evident from FIG. 3*b*, the lamellae 112*a* of the first lamella set 110*a* and the lamellae 112*b* of the second lamella set 110*b* have the same width d. Likewise, the width of the grooves 114*a* corresponds to the width of the grooves 114*b*. The only difference between the two lamella sets 110*a*, 110*b* thus lies in their arrangement within the lamella block 100.

As evident from FIG. 3*b*, the first lamella set 110*a* is arranged offset relative to the second lamella set 110*b* along the lamella block 100. The first lamella set 110*a* is arranged offset relative to the second lamella set 110*b* in such a way that the lamellae 112*b* of the second lamella set 110*b* each coincide with grooves 114*a* of the first lamella set 110*a* along the lamella block 100 and vice versa. In other words, the lamellae 112a of the first lamella set 110a are arranged at positions in the longitudinal direction L where the grooves 114b of the second lamella set 110b are provided and vice versa. A lamella structure 110 with two lamella sets 110a, 110b arranged complementarily to each other thus arises. These two lamella sets 110a, 110b arranged complementarily to each other can be made to engage with each other.

Figure 4:
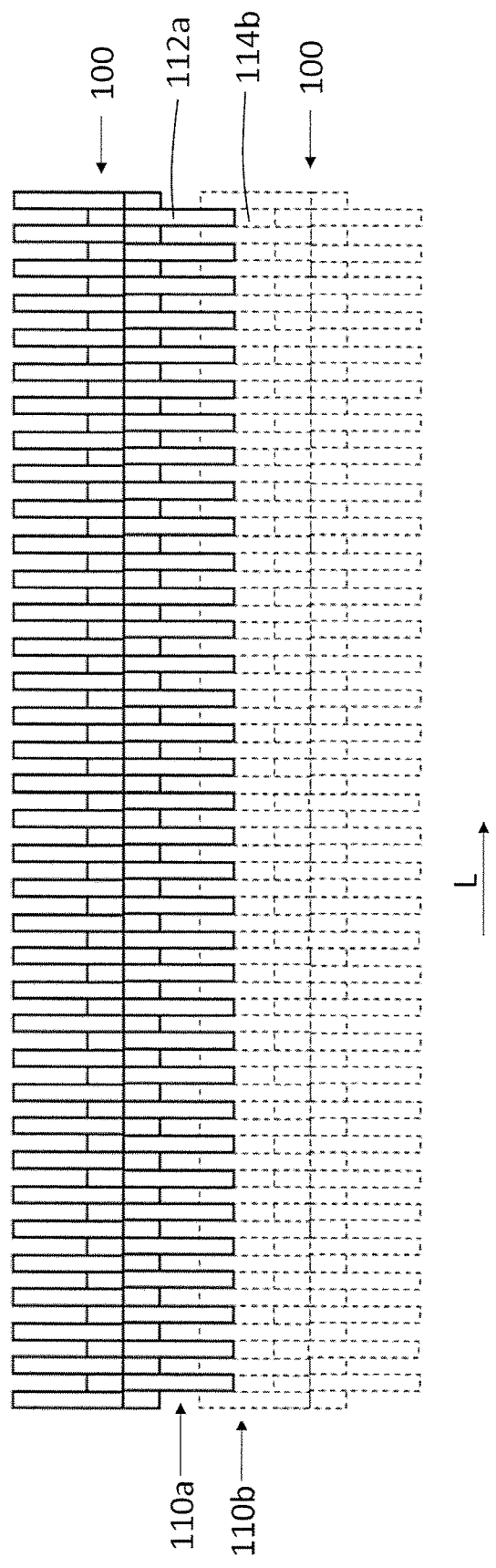
FIG. 4 is an illustration of an arrangement of two lamella blocks according to the invention.

FIG. 4 exemplarily shows the engagement of two adjacently arranged lamella blocks 100. In order to better illustrate the engagement, one of the two lamella blocks 100 was denoted by a broken line. However, it must be remembered that the two lamella blocks 100 are identically designed. But since the two lamella blocks 100 each have a lamella structure 110 with two lamella sets 110a and 110b arranged complimentarily to each other, the first lamella set 110a of the one lamella block 100 (upper lamella block 100 on FIG. 4) can be made to engage with the second lamella set 110b of the second, neighboring lamella block 100 (lower lamella block on FIG. 4). The two lamella blocks 100 need not be displaced relative to each other in the longitudinal direction L to make the two lamella blocks 100 engage with each other. Rather, the two engaged lamella blocks 100 are congruently arranged in the longitudinal direction L. As a consequence, a single set of lamella blocks 100 is sufficient according to the present invention to generate a calibrating basket.

Figure 5:
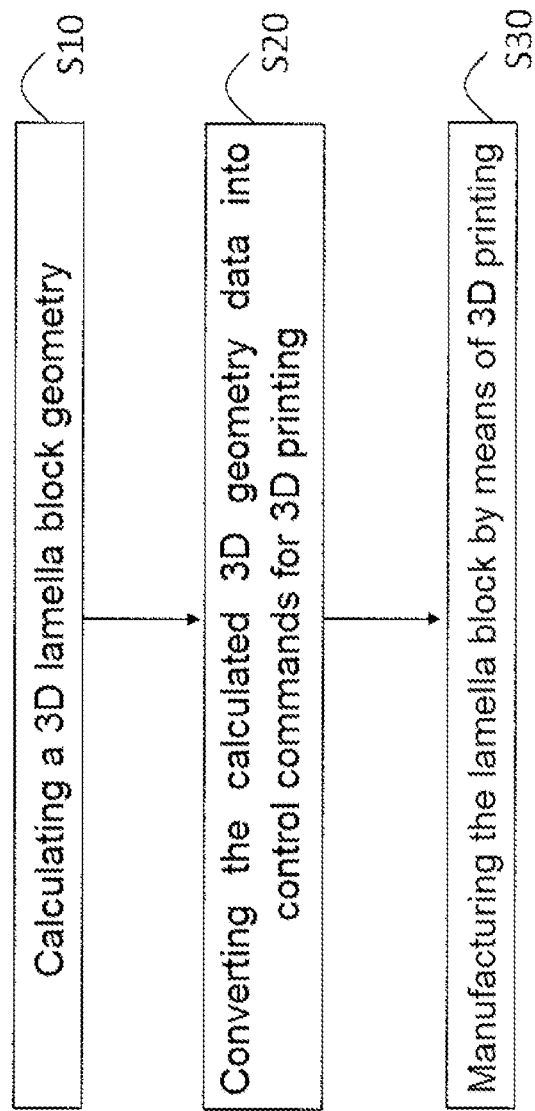
FIG. 5 is a block diagram of a method for manufacturing the lamella block shown on FIGS. 3a and 3b.

A generative or additive manufacturing method can be used for manufacturing the lamella block 100 shown on FIGS. 3a and 3b. Such a manufacturing method is shown on FIG. 5. In a first step S10, 3D geometry data (CAD data) are here generated for the lamella block 100. The 3D geometry data describe the geometry of the entire lamella block 100 comprising the carrier structure 120 and the lamella structure 110, 110a. In a subsequent second step S20, the calculated 3D geometry data are converted into control commands for 3D printing. Based on the generated control commands, the lamella block 100 (in its entirety) is then built up layer by layer by means of a 3D printing process (e.g., laser sintering, laser melting) (step S30). A metal material or a polymer material can be used as the material for 3D printing.

As an alternative to manufacturing by means of 3D printing as described here, it is also conceivable that the lamella blocks 100 be manufactured out of one workpiece (for example via milling, drilling, cutting) or in a casting process.

Figure 6:
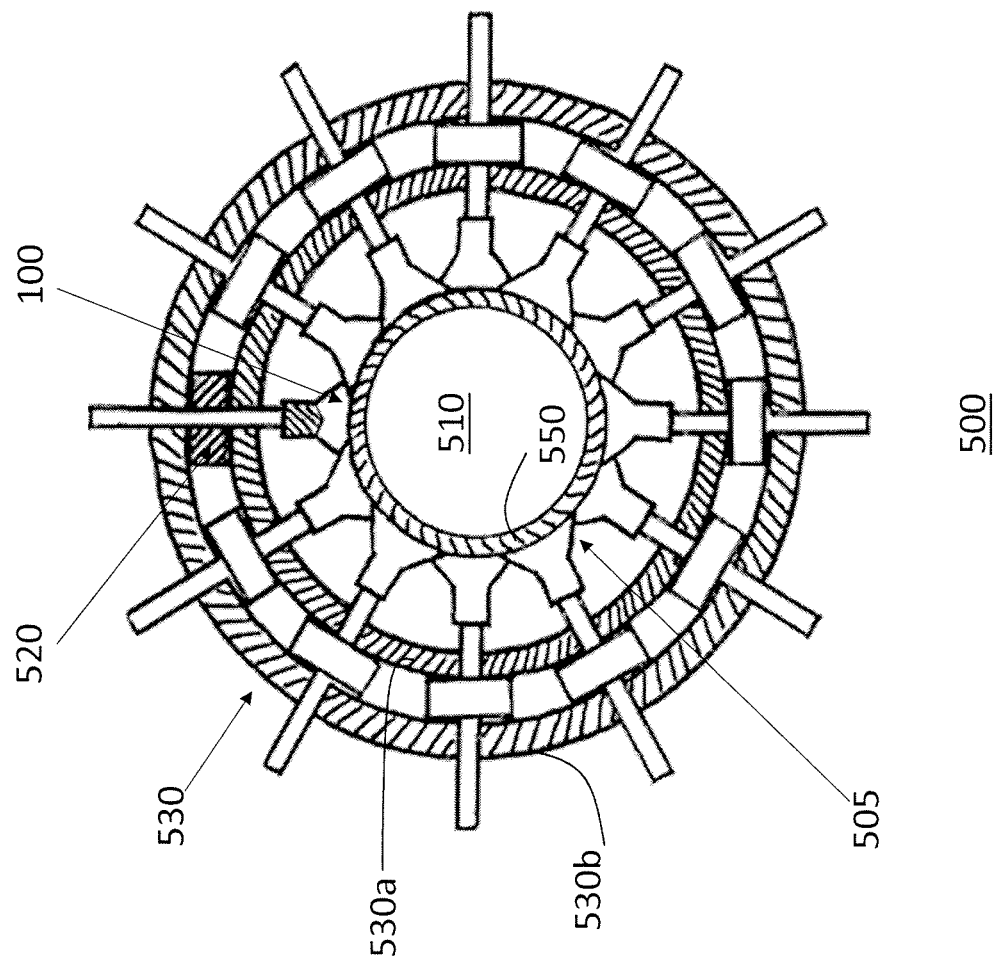
FIG. 6 is a calibrating device according to the present invention.

Described in conjunction with FIG. 6 is a calibrating device 500 for calibrating an extruded plastic profile 550. FIG. 6 shows a sectional view of the calibrating device 500. The profile 550 to be calibrated is a pipe profile in the implementation depicted on FIG. 6.

The calibrating device 500 comprises a plurality of the lamella blocks 100 according to the invention described above, which are arranged in such a way relative to each other in the peripheral direction of the calibrating device 500 as to form a calibration basket 505 with a desired calibrating opening 510. As further schematically denoted on FIG. 5, the neighboring lamella blocks 100 can be arranged so as to intermesh. The lamellae 112a, 112b and grooves 114a, 114b of neighboring lamella blocks 100 are tailored to each other in terms of their arrangement and dimensions (in particular in terms of the groove width and lamella width) in such a way that the lamellae 112 of neighboring lamella blocks 100 can mesh into each other in a comb-like manner, as described further above in conjunction with FIGS. 3a, 3b and 4.

The calibrating device 500 further comprises a plurality of activating devices 520 (for example, linear actuators), wherein one respective activating device 520 is coupled with one lamella block 100. The activating devices 520 are provided to displace the respective lamella blocks 100 in a radial direction (i.e., perpendicular to the feed direction of the profile to be calibrated). This makes it possible to correspondingly adjust the active cross section of the calibrating opening 510 to the profile 550 to be calibrated.

The calibrating device 500 further comprises a housing 530 for receiving the activating devices 520 and the lamella blocks 100. The housing 530 can be cylindrical in design. It can have an inner housing cylinder 530a and an outer housing cylinder 530b, wherein components of the activating device 520 can be arranged in the gap between the inner housing cylinder 530a and the outer housing cylinder 530b, similarly to the calibrating device described in DE 198 43 340 C2.

The lamella block design according to the invention described above makes it possible to quickly and easily build up an offset-free calibrating basket with only a single set of lamella blocks. It is no longer necessary to use different lamella blocks tailored to each other in terms of design.

What is claimed is:

1. A lamella block for a calibrating device for calibrating an extruded profile, wherein the lamella block comprises:
  a carrier structure having opposite first and second walls extending along a longitudinal direction of the lamella block, said first and second walls residing on first and second imaginary planes, respectively; and
  a lamella structure having a plurality of lamellae all extending outwards from the carrier structure and being spaced apart from each other in the longitudinal direction by grooves, wherein the plurality of lamellae comprises first and second lamella sets, wherein lamellae of the first lamella set are arranged offset relative to lamellae of the second lamella set in the longitudinal direction of the lamella block,
  wherein each lamellae of the first lamella set extends beyond the first imaginary plane in a direction normal thereto, and does not extend beyond the second imaginary plane in a direction normal thereto, and
  wherein each lamellae of the second lamella set extends beyond the second imaginary plane in said direction normal thereto, and does not extend beyond the first imaginary plane in said direction normal thereto.

2. The lamella block according to claim 1, wherein the lamellae of the first lamella set and the lamellae of the second lamella set have the same shape in mirror-image.

3. The lamella block according to claim 1, wherein the first and second lamella sets have an identical or differing division.

4. The lamella block according to claim 1, wherein the lamellae of the first lamella set are arranged offset in relation to the lamellae of the second lamella set in such a way that the lamellae of the first lamella set coincide with the grooves of the second lamella set in the longitudinal direction of the lamella block.

5. The lamella block according to claim 1, wherein the carrier structure and the plurality of lamellae are fabricated out of the same material or out of different materials.

6. The lamella block according to claim 1, wherein the lamella block is integrally designed.

7. The lamella block according to claim 1, wherein the lamella block is manufactured by means of 3D printing or by means of an additive manufacturing process.

8. A calibrating device for calibrating extruded profiles, comprising a plurality of lamella blocks according to claim 1, wherein the lamella blocks are arranged relative to each other to form a calibrating opening.

9. The calibrating device according to claim 8, wherein the calibrating device comprises a plurality of activating devices, wherein each activating device is coupled with a respective lamella block so as to individually activate each lamella block.

10. A method for manufacturing a lamella block according to claim 1, comprising the step of manufacturing the lamella block by means of 3D printing or by means of additive manufacturing.

11. The method according to claim 10, further comprising the step of calculating a lamella block geometry and converting the calculated 3D geometric data into corresponding control commands for 3D printing or additive manufacturing.

12. A method for manufacturing a lamella block, comprising the following steps:

generating a dataset, which images the lamella block according to claim 1;

storing the dataset on a storage device or a server; and inputting the dataset into a processing device or a computer, which actuates an additive manufacturing device so that the latter fabricates the lamella block imaged in the dataset.

13. A computer program, comprising datasets, which while the datasets are being read in by a processing device or a computer, prompts the processing device or the computer to actuate an additive manufacturing device in such a way that the additive manufacturing device fabricates the lamella block with the features according to claim 1.

14. A computer-readable data carrier, which stores the computer program according to claim 13.

15. A dataset, which images the lamella block with the features according to claim 1.

16. The lamella block according to claim 1, wherein the first and second imaginary planes are parallel with respect to one another.

* * * * *